US005484694A

United States Patent [19]

Lelental et al.

[11] Patent Number: 5,484,694

[45] Date of Patent: Jan. 16, 1996

[54] IMAGING ELEMENT COMPRISING AN ELECTRICALLY-CONDUCTIVE LAYER CONTAINING ANTIMONY-DOPED TIN OXIDE PARTICLES

[75] Inventors: Mark Lelental, Rochester; Paul A. Christian; Ibrahim M. Shalhoub, both of Pittsford; Thomas N. Blanton, Rochester, all of N.Y.

[73] Assignee: Eastman Kodak Company, Rochester, N.Y.

[21] Appl. No.: 342,959

[22] Filed: Nov. 21, 1994

[51] Int. Cl.$^{6}$ .............................. G03C 1/85; C01G 19/02

[52] U.S. Cl. .......................... 430/530; 430/533; 430/539; 430/63; 430/930; 423/618

[58] Field of Search ............................ 423/618; 430/530, 430/930, 533, 539, 63

[56] References Cited

U.S. PATENT DOCUMENTS

| | | | |
|---|---|---|---|
| 4,275,103 | 6/1981 | Tsubusaki et al. | 428/148 |
| 4,394,441 | 7/1983 | Kawaguchi et al. | 430/530 |
| 4,416,963 | 11/1983 | Takimoto et al. | 430/530 |
| 4,418,141 | 11/1983 | Kawaguchi et al. | 430/530 |
| 4,431,764 | 2/1984 | Yoshizumi | 524/409 |
| 4,495,276 | 1/1985 | Takimoto et al. | 430/530 |
| 4,571,361 | 2/1986 | Kawaguchi et al. | 428/328 |
| 4,999,276 | 3/1991 | Kuwabara et al. | 430/530 |
| 5,122,445 | 6/1992 | Ishigaki | 430/530 |
| 5,340,676 | 8/1994 | Anderson et al. | 430/530 |
| 5,382,494 | 1/1995 | Kudo et al. | 430/530 |

*Primary Examiner*—Charles L. Bowers, Jr.
*Assistant Examiner*—Mark F. Huff
*Attorney, Agent, or Firm*—Alfred P. Lorenzo

[57] ABSTRACT

Imaging elements, such as photographic, electrostatographic and thermal imaging elements, are comprised of a support, an image-forming layer and an electrically-conductive layer comprising a dispersion in a film-forming binder of very small particles of antimony-doped tin oxide having a high antimony dopant level and a small crystallite size. Use of such particles provides a controlled degree of electrical conductivity and beneficial chemical, physical and optical properties which adapt the electrically-conductive layer for such purposes as providing protection against static or serving as an electrode which takes part in an image-forming process.

18 Claims, 3 Drawing Sheets

IMAGING ELEMENT COMPRISING AN ELECTRICALLY-CONDUCTIVE LAYER CONTAINING ANTIMONY-DOPED TIN OXIDE PARTICLES

FIELD OF THE INVENTION

This invention relates in general to imaging elements, such as photographic, electrostatographic and thermal imaging elements, and in particular to imaging elements comprising a support, an image-forming layer and an electrically-conductive layer. More specifically, this invention relates to electrically-conductive layers containing electronically-conductive particles and to the use of such electrically-conductive layers in imaging elements for such purposes as providing protection against the generation of static electrical charges or serving as an electrode which takes part in an image-forming process.

BACKGROUND OF THE INVENTION

Problems associated with the formation and discharge of electrostatic charge during the manufacture and utilization of photographic film and paper have been recognized for many years by the photographic industry. The accumulation of charge on film or paper surfaces leads to the attraction of dust, which can produce physical defects. The discharge of accumulated charge during or after the application of the sensitized emulsion layer(s) can produce irregular fog patterns or "static marks" in the emulsion. The severity of static problems has been exacerbated greatly by increases in the sensitivity of new emulsions, increases in coating machine speeds, and increases in post-coating drying efficiency. The charge generated during the coating process results primarily from the tendency of webs of high dielectric constant polymeric film base to charge during winding and unwinding operations (unwinding static), during transport through the coating machines (transport static), and during post-coating operations such as slitting and spooling. Static charge can also be generated during the use of the finished photographic film product. In an automatic camera, the winding of roll film out of and back into the film cassette, especially in a low relative humidity environment, can result in static charging. Similarly, high-speed automated film processing can result in static charge generation. Sheet films are especially subject to static charging during removal from light-tight packaging (e.g., x-ray films).

It is generally known that electrostatic charge can be dissipated effectively by incorporating one or more electrically-conductive "antistatic" layers into the film structure. Antistatic layers can be applied to one or to both sides of the film base as subbing layers either beneath or on the side opposite to the light-sensitive silver halide emulsion layers. An antistatic layer can alternatively be applied as an outer coated layer either over the emulsion layers or on the side of the film base opposite to the emulsion layers or both. For some. applications, the antistatic agent can be incorporated into the emulsion layers. Alternatively, the antistatic agent can be directly incorporated into the film base itself.

A wide variety of electrically-conductive materials can be incorporated into antistatic layers to produce a wide range of conductivities. Most of the traditional antistatic systems for photographic applications employ ionic conductors. Charge is transferred in ionic conductors by the bulk diffusion of charged species through an electrolyte. Antistatic layers containing simple inorganic salts, alkali metal salts of surfactants, ionic conductive polymers, polymeric electrolytes containing alkali metal salts, and colloidal metal oxide sols (stabilized by metal salts) have been described previously. The conductivities of these ionic conductors are typically strongly dependent on the temperature and relative humidity in their environment. At low humidities and temperatures, the diffusional mobilities of the ions are greatly reduced and conductivity is substantially decreased. At high humidities, antistatic backcoatings often absorb water, swell, and soften. In roll film, this results in adhesion of the backcoating to the emulsion side of the film. Also, many of the inorganic salts, polymeric electrolytes, and low molecular weight surfactants used are water-soluble and are leached out of the antistatic layers during processing, resulting in a loss of antistatic function.

Colloidal metal oxide sols which exhibit ionic conductivity when included in antistatic layers are often used in imaging elements. Typically, alkali metal salts or anionic surfactants are used to stabilize these sols. A thin antistatic layer consisting of a gelled network of colloidal metal oxide particles (e.g., silica, antimony pentoxide, alumina, titania, stannic oxide, zirconia) with an optional polymeric binder to improve adhesion to both the support and overlying emulsion layers has been disclosed in EP 250,154. An optional ambifunctional silane or titanate coupling agent can be added to the gelled network to improve adhesion to overlying emulsion layers (e.g., EP 301,827; U.S. Pat. No. 5,204,219) along with an optional alkali metal orthosilicate to minimize loss of conductivity by the gelled network when it is overcoated with gelatin-containing layers (U.S. Pat. No. 5,236,818). Also, it has been pointed out that coatings containing colloidal metal oxides (e.g., antimony pentoxide, alumina, tin oxide, indium oxide) and colloidal silica with an organopolysiloxane binder afford enhanced abrasion resistance as well as provide antistatic function (U.S. Pat. Nos. 4,442,168 and 4,571,365).

Antistatic systems employing electronic conductors have also been described. Because the conductivity depends predominantly on electronic mobilities rather than ionic mobilities, the observed electronic conductivity is independent of relative humidity and only slightly influenced by the ambient temperature. Antistatic layers have been described which contain conjugated polymers, conductive carbon particles or semiconductive inorganic particles.

Trevoy (U.S. Pat. No. 3,245,833) has taught the preparation of conductive coatings containing semiconductive silver or copper iodide dispersed as particles less than 0.1 μm in size in an insulating film-forming binder, exhibiting a surface resistivity of $10^2$ to $10^{11}$ ohms per square. The conductivity of these coatings is substantially independent of the relative humidity. Also, the coatings are relatively clear and sufficiently transparent to permit their use as antistatic coatings for photographic film. However, if a coating containing copper or silver iodides was used as a subbing layer on the same side of the film base as the emulsion, Trevoy found (U.S. Pat. No. 3,428,451) that it was necessary to overcoat the conductive layer with a dielectric, water-impermeable barrier layer to prevent migration of semiconductive salt into the silver halide emulsion layer during processing. Without the barrier layer, the semiconductive salt could interact deleteriously with the silver halide layer to form fog and a loss of emulsion sensitivity. Also, without a barrier layer, the semiconductive salts are solubilized by processing solutions, resulting in a loss of antistatic function.

Another semiconductive material has been disclosed by Nakagiri and Inayama (U.S. Pat. No. 4,078,935) as being useful in antistatic layers for photographic applications.

Transparent, binderless, electrically semiconductive metal oxide thin films were formed by oxidation of thin metal films which had been vapor deposited onto film base. Suitable transition metals include titanium, zirconium, vanadium, and niobium. The microstructure of the thin metal oxide films is revealed to be non-uniform and discontinuous, with an "island" structure almost "particulate" in nature. The surface resistivity of such semiconductive metal oxide thin films is independent of relative humidity and reported to range from $10^5$ to $10^9$ ohms per square. However, the metal oxide thin films are unsuitable for photographic applications since the overall process used to prepare these thin films is complicated and costly, abrasion resistance of these thin films is low, and adhesion of these thin films to the base is poor.

A highly effective antistatic layer incorporating an "amorphous" semiconductive metal oxide has been disclosed by Guestaux (U.S. Pat. No. 4,203,769). The antistatic layer is prepared by coating an aqueous solution containing a colloidal gel of vanadium pentoxide onto a film base. The colloidal vanadium pentoxide gel typically consists of entangled, high aspect ratio, flat ribbons 50–100 Å wide, about 10 Å thick, and 1,000–10,000 Å long. These ribbons stack flat in the direction perpendicular to the surface when the gel is coated onto the film base. This results in electrical conductivities for thin films of vanadium pentoxide gels (about 1 $\Omega^{-1}cm^{-1}$) which are typically about three orders of magnitude greater than is observed for similar thickness films containing crystalline vanadium pentoxide particles. In addition, low surface resistivities can be obtained with very low vanadium pentoxide coverages. This results in low optical absorption and scattering losses. Also, the thin films are highly adherent to appropriately prepared film bases. However, vanadium pentoxide is soluble at high pH and must be overcoated with a non-permeable, hydrophobic barrier layer in order to survive processing. When used with a conductive subbing layer, the barrier layer must be coated with a hydrophilic layer to promote adhesion to emulsion layers above. (See Anderson et al, U.S. Pat. No. 5,006,451.)

Conductive fine particles of crystalline metal oxides dispersed with a polymeric binder have been used to prepare optically transparent, humidity insensitive, antistatic layers for various imaging applications. Many different metal oxides—such as ZnO, $TiO_2$, $ZrO_2$, $SnO_2$, $Al_2O_3$, $In_2O_3$, $SiO_2$, MgO, BaO, $MoO_3$ and $V_2O_5$—are alleged to be useful as antistatic agents in photographic elements or as conductive agents in electrostatographic elements in such patents as U.S. Pat. Nos. 4,275,103, 4,394,441, 4,416,963, 4,418,141, 4,431,764, 4,495,276, 4,571,361, 4,999,276 and 5,122,445. However, many of these oxides do not provide acceptable performance characteristics in these demanding environments. Preferred metal oxides are antimony doped tin oxide, aluminum doped zinc oxide, and niobium doped titanium oxide. Surface resistivities are reported to range from $10^6$–$10^9$ ohms per square for antistatic layers containing the preferred metal oxides. In order to obtain high electrical conductivity, a relatively high coverage (0.5–5 $g/m^2$) of metal oxide must be included in the antistatic layer. This results in decreased optical transparency for thick antistatic coatings. The high values of refractive index (>2.0) of the preferred metal oxides necessitates that the metal oxides be dispersed in the form of ultrafine (<0.1 μm) particles in order to minimize light scattering (haze) by the antistatic layer.

Antistatic layers comprising electroconductive ceramic particles, such as particles of TiN, $NbB_2$, TiC, $LaB_6$ or MoB, dispersed in a binder such as a water-soluble polymer or solvent-soluble resin are described in Japanese Kokai No. 4/55492, published Feb. 24, 1992.

Fibrous conductive powders comprising antimony-doped tin oxide coated onto non-conductive potassium titanate whiskers have been used to prepare conductive layers for photographic and electrographic applications. Such materials are disclosed, for example, in U.S. Pat. Nos., 4,845,369 and 5,116,666. Layers containing these conductive whiskers dispersed in a binder reportedly provide improved conductivity at lower volumetric concentrations than other conductive fine particles as a result of their higher aspect ratio. However, the benefits obtained as a result of the reduced volume percentage requirements are offset by the fact that these materials are relatively large in size such as 10 to 20 micrometers in length, and such large size results in increased light scattering and hazy coatings.

Use of a high weight coverage with a high volume percentage of conductive particles in an electro-conductive coating to achieve effective antistatic performance can result in reduced transparency due to scattering losses and in the formation of brittle layers that are subject to cracking and exhibit poor adherence to the support material. It is thus apparent that it is extremely difficult to obtain non-brittle, adherent, highly transparent, colorless electro-conductive coatings with humidity-independent process-surviving antistatic performance.

The requirements for antistatic layers in silver halide photographic films are especially demanding because of the stringent optical requirements. Other types of imaging elements such as photographic papers and thermal imaging elements also frequently require the use of an antistatic layer but, generally speaking, these imaging elements have less stringent requirements.

Electrically-conductive layers are also commonly used in imaging elements for purposes other than providing static protection. Thus, for example, in electrostatographic imaging it is well known to utilize imaging elements comprising a support, an electrically-conductive layer that serves as an electrode, and a photoconductive layer that serves as the image-forming layer. Electrically-conductive agents utilized as antistatic agents in photographic silver halide imaging elements are often also useful in the electrode layer of electrostatographic imaging elements.

As indicated above, the prior art on electrically-conductive layers in imaging elements is extensive and a very wide variety of different materials have been proposed for use as the electrically-conductive agent. There is still, however, a critical need in the art for improved electrically-conductive layers which are useful in a wide variety of imaging elements, which can be manufactured at reasonable cost, which are resistant to the effects of humidity change, which are durable and abrasion-resistant, which are effective at low coverage, which are adaptable to use with transparent imaging elements, which do not exhibit adverse sensitometric or photographic effects, and which are substantially insoluble in solutions with which the imaging element typically comes in contact, for example, the aqueous alkaline developing solutions used to process silver halide photographic films.

One of the most useful electronically-conductive agents for use in electrically-conductive layers of imaging elements is antimony-doped tin oxide. Among the many patents describing the use of antimony-doped tin oxide in an electrically-conductive layer of an imaging element are U.S. Pat. Nos. 4,275,103, 4,394,441, 4,416,963, 4,418,141, 4,431,764, 4,495,276, 4,571,361, 4,999,276 and 5,122,445. As described in the prior art, the antimony-doped tin oxide particles are dispersed in a suitable film-forming binder to form the electrically-conductive layer. While excellent results are obtained by this means, still further improvement in reducing the dry weight coverage of conductive particles needed to obtain a desired low surface resistivity, and thereby providing improved transparency, would represent a substantial advance in this art.

It is toward the objective of providing improved electrically-conductive layers that more effectively meet the diverse needs of imaging elements —especially of silver halide photographic films but also of a wide range of other imaging elements—than those of the prior art that the present invention is directed.

SUMMARY OF THE INVENTION

In accordance with this invention, an imaging element for use in an image-forming process is comprised of a support, an image-forming layer and an electrically-conductive layer comprising particles of electronically-conductive antimony-doped tin oxide dispersed in a film-forming binder and is characterized in that the antimony-doped tin oxide is in the form of particles having an antimony dopant level of greater than 8 atom percent, an X-ray crystallite size of less than 100 Angstroms and an average equivalent circuit diameter of less than 15 nanometers but no less than the X-ray crystallite size.

The imaging elements of this invention can contain one or more image-forming layers and one or more electrically-conductive layers and such layers can be coated on any of a very wide variety of supports. Use of an electronically-conductive antimony-doped tin oxide, with the aforesaid combination of a high antimony dopant level of greater than 8 atom percent, a small crystallite size (as measured by X-ray diffraction) of less than 100 Angstroms, and a primary particle size characterized by an average equivalent circular diameter of less than 15 nanometers dispersed in a suitable film-forming binder enables the preparation of a thin, highly conductive, transparent layer which is strongly adherent to photographic supports as well as to overlying layers such as emulsion layers, pelloids, topcoats, backcoats, and the like. The electrical conductivity provided by the conductive layer of this invention is independent of relative humidity and persists even after exposure to aqueous solutions with a wide range of pH values (i.e., $2 \leq pH \leq 13$) such as are encountered in the processing of photographic elements.

As hereinafter described in full detail, it has been discovered that antimony-doped tin oxides which have both a high antimony content and a small crystallite size can be milled to very small size particles which provide superior performance when used as electronically-conductive agents in electrically-conductive layers of imaging elements. In particular, they can be milled to particles with an average equivalent circular diameter of less than 15 nanometers without significantly degrading their electrical conductivity and as a consequence of their very small size can be used at very low dry weight coverages, preferably at less than 2000 $mg/m^2$, to provide both high electrical conductivity and a high degree of transparency.

DESCRIPTION OF THE PREFERRED EMBODIMENTS

Figure 1:
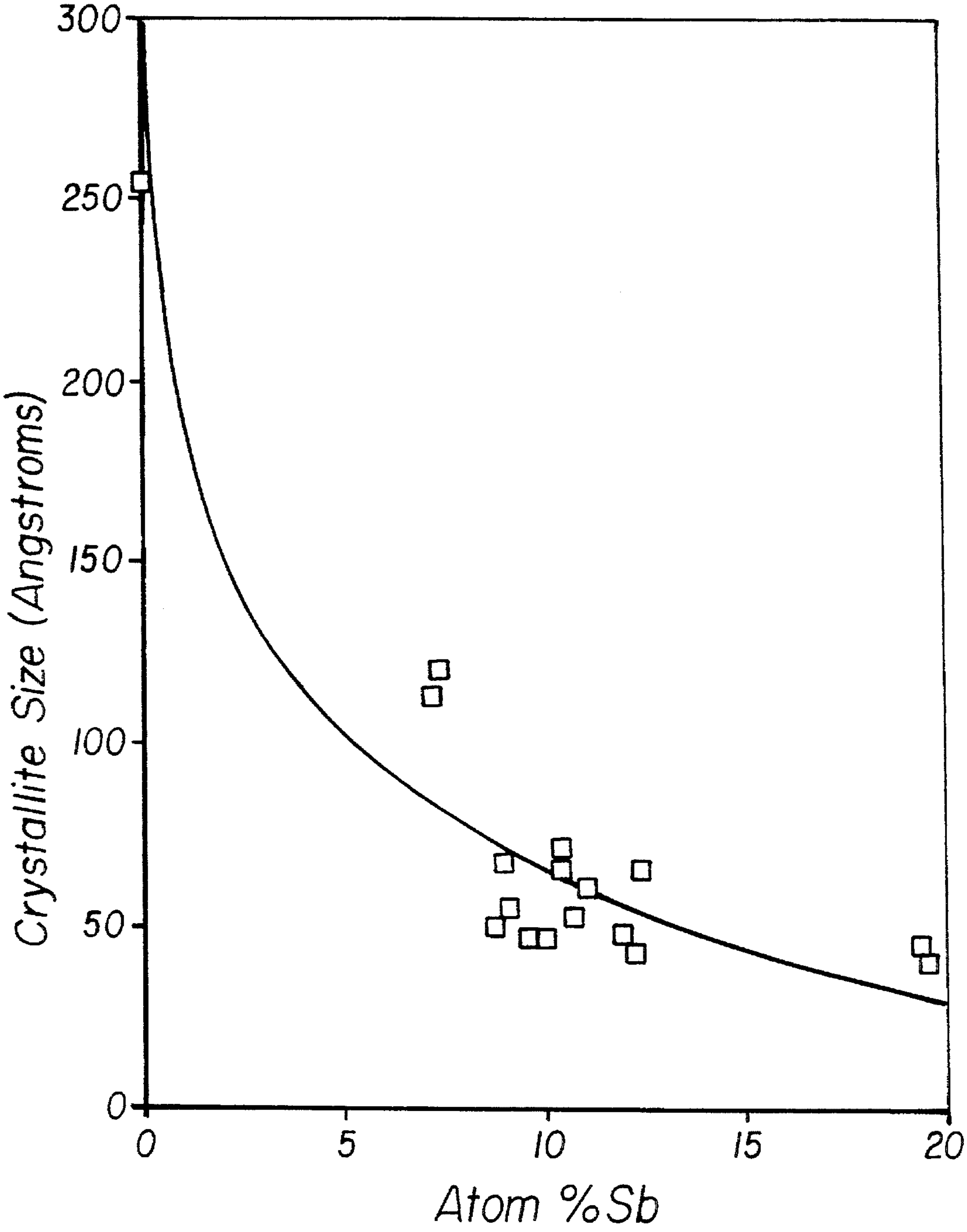
FIG. 1 is a plot showing the relationship of X-ray crystallite size and antimony dopant level for a variety of commercial antimony-doped tin oxides.

The imaging elements of this invention can be of many different types depending on the particular use for which they are intended. Such elements include, for example, photographic, electrostatographic, photothermographic, migration, electrothermographic, dielectric recording and thermal-dye-transfer imaging elements.

Photographic elements which can be provided with an antistatic layer in accordance with this invention can differ widely in structure and composition. For example, they can vary greatly in regard to the type of support, the number and composition of the image-forming layers, and the kinds of auxiliary layers that are included in the elements. In particular, the photographic elements can be still films, motion picture films, x-ray films, graphic arts films, paper prints or microfiche. They can be black-and-white elements, color elements adapted for use in a negative-positive process, or color elements adapted for use in a reversal process.

Photographic elements can comprise any of a wide variety of supports. Typical supports include cellulosenitrate film, cellulose acetate film, poly(vinyl acetal) film, polystyrene film, poly(ethylene terephthalate) film, poly(ethylene naphthalate) film, polycarbonate film, glass, metal, paper, polymer-coated paper, and the like. The image-forming layer or layers of the element typically comprise a radiation-sensitive agent, e.g., silver halide, dispersed in a hydrophilic water-permeable colloid. Suitable hydrophilic vehicles include both naturally-occurring substances such as proteins, for example, gelatin, gelatin derivatives, cellulose derivatives, polysaccharides such as dextran, gum arabic, and the like, and synthetic polymeric substances such as water-soluble polyvinyl compounds like poly(vinylpyrrolidone), acrylamide polymers, and the like. A particularly common example of an image-forming layer is a gelatin-silver halide emulsion layer.

In electrostatography an image comprising a pattern of electrostatic potential (also referred to as an electrostatic latent image) is formed on an insulative surface by any of various methods. For example, the electrostatic latent image may be formed electrophotographically (i.e., by imagewise radiation-induced discharge of a uniform potential previously formed on a surface of an electrophotographic element comprising at least a photoconductive layer and an electrically-conductive substrate), or it may be formed by dielectric recording (i.e., by direct electrical formation of a pattern of electrostatic potential on a surface of a dielectric material). Typically, the electrostatic latent image is then developed into a toner image by contacting the latent image with an electrographic developer (if desired, the latent image can be transferred to another surface before development). The resultant toner image can then be fixed in place on the surface by application of heat and/or pressure or other known methods (depending upon the nature of the surface and of the toner image) or can be transferred by known means to another surface, to which it then can be similarly fixed.

In many electrostatographic imaging processes, the surface to which the toner image is intended to be ultimately transferred and fixed is the surface of a sheet of plain paper or, when it is desired to view the image by transmitted light (e.g., by projection in an overhead projector), the surface of a transparent film sheet element.

In electrostatographic elements, the electrically-conductive layer can be a separate layer, a part of the support layer or the support layer. There are many types of conducting layers known to the electrostatographic art, the most common being listed below:

(a) metallic laminates such as an aluminum-paper laminate, (b) metal plates, e.g., aluminum, copper, zinc, brass, etc., (c) metal foils such as aluminum foil, zinc foil, etc., (d) vapor deposited metal layers such as silver, aluminum, nickel, etc., (e) semiconductors dispersed in resins such as poly(ethylene terephthalate) as described in U.S. Pat. No. 3,245,833, (f) electrically conducting salts such as described in U.S. Pat. Nos. 3,007,801 and 3,267,807.

Conductive layers (d), (e) and (f) can be transparent and can be employed where transparent elements are required, such as in processes where the element is to be exposed from the back rather than the front or where the element is to be used as a transparency.

Thermally processable imaging elements, including films and papers, for producing images by thermal processes are well known. These elements include thermographic elements in which an image is formed by imagewise heating the element. Such elements are described in, for example, *Research Disclosure,* June 1978, Item No. 17029; U.S. Pat. No. 3,457,075; U.S. Pat. No. 3,933,508; and U.S. Pat. No. 3,080,254.

Photothermographic elements typically comprise an oxidation-reduction image-forming combination which contains an organic silver salt oxidizing agent, preferably a silver salt of a long-chain fatty acid. Such organic silver salt oxidizing agents are resistant to darkening upon illumination. Preferred organic silver salt oxidizing agents are silver salts of long-chain fatty acids containing 10 to 30 carbon atoms. Examples of useful organic silver salt oxidizing agents are silver behenate, silver stearate, silver oleate, silver laurate, silver hydroxystearate, silver caprate, silver myristate and silver palmitate. Combinations of organic silver salt oxidizing agents are also useful. Examples of useful silver salt oxidizing agents which are not silver salts of long-chain fatty acids include, for example, silver benzoate and silver benzotriazole.

Photothermographic elements also comprise a photosensitive component which consists essentially of photographic silver halide. In photothermographic materials it is believed that the latent image silver from the silver halide acts as a catalyst for the oxidation-reduction image-forming combination upon processing. A preferred concentration of photographic silver halide is within the range of about 0.01 to about 10 moles of photographic silver halide per mole of organic silver salt oxidizing agent, such as per mole of silver behenate, in the photothermographic material. Other photosensitive silver salts are useful in combination with the photographic silver halide if desired. Preferred photographic silver halides are silver chloride, silver bromide, silver bromoiodide, silver chlorobromoiodide and mixtures of these silver halides. Very fine grain photographic silver halide is especially useful.

Migration imaging processes typically involve the arrangement of particles on a softenable medium. Typically, the medium, which is solid and impermeable at room temperature, is softened with heat or solvents to permit particle migration in an imagewise pattern.

As disclosed in R. W. Gundlach, "Xeroprinting Master with Improved Contrast Potential", *Xerox Disclosure Journal,* Vol. 14, No. 4, July/August 1984, pages 205–06, migration imaging can be used to form a xeroprinting master element. In this process, a monolayer of photosensitive particles is placed on the surface of a layer of polymeric material which is in contact with a conductive layer. After charging, the element is subjected to imagewise exposure which softens the polymeric material and causes migration of particles where such softening occurs (i.e., image areas). When the element is subsequently charged and exposed, the image areas (but not the non-image areas) can be charged, developed, and transferred to paper.

Another type of migration imaging technique, disclosed in U.S. Pat. No. 4,536,457 to Tam, U.S. Pat. No. 4,536,458 to Ng, and U.S. Pat. No. 4,883,731 to Tam et al, utilizes a solid migration imaging element having a substrate and a layer of softenable material with a layer of photosensitive marking material deposited at or near the surface of the softenable layer. A latent image is formed by electrically charging the member and then exposing the element to an imagewise pattern of light to discharge selected portions of the marking material layer. The entire softenable layer is then made permeable by application of the marking material, heat or a solvent, or both. The portions of the marking material which retain a differential residual charge due to light exposure will then migrate into the softened layer by electrostatic force.

An imagewise pattern may also be formed with colorant particles in a solid imaging element by establishing a density differential (e.g., by particle agglomeration or coalescing) between image and non-image areas. Specifically, colorant particles are uniformly dispersed and then selectively migrated so that they are dispersed to varying extents without changing the overall quantity of particles on the element.

Another migration imaging technique involves heat development, as described by R. M. Schaffert, *Electrophotography,* (Second Edition, Focal Press, 1980), pp. 44–47 and U.S. Pat. No. 3,254,997. In this procedure, an electrostatic image is transferred to a solid imaging element, having colloidal pigment particles dispersed in a heat-softenable resin film on a transparent conductive Substrate. After softening the film with heat, the charged colloidal particles migrate to the oppositely charged image. As a result, image areas have an increased particle density, while the background areas are less dense.

An imaging process known as "laser toner fusion", which is a dry electrothermographic process, is also of significant commercial importance. In this process, uniform dry powder toner depositions on non-photosensitive films, papers, or lithographic printing plates are imagewise exposed with high power (0.2–0.5 W) laser diodes thereby "tacking" the toner particles to the substrate(s). The toner layer is made, and the non-imaged toner is removed, using such techniques as electrographic "magnetic brush" technology similar to that found in copiers. A final blanket fusing step may also be needed, depending on the exposure levels.

Another example of imaging elements which employ an antistatic layer are dye-receiving elements used in thermal dye transfer systems.

Thermal dye transfer systems are commonly used to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are described in U.S. Pat. No. 4,621,271.

In EPA No. 194,106, antistatic layers are disclosed for coating on the back side of a dye-receiving element. Among the materials disclosed for use are electrically-conductive inorganic powders such as a "fine powder of titanium oxide or zinc oxide."

Another type of image-forming process in which the imaging element can make use of an electrically-conductive layer is a process employing an imagewise exposure to electric current of a dye-forming electrically-activatable recording element to thereby form a developable image followed by formation of a dye image, typically by means of thermal development. Dye-forming electrically activatable recording elements and processes are well known and are described in such patents as U.S. Pat. No. 4,343,880 and 4,727,008.

In the imaging elements of this invention, the image-forming layer can be any of the types of image-forming layers described above, as well as any other image-forming layer known for use in an imaging element.

All of the imaging processes described hereinabove, as well as many others, have in common the use of an electrically-conductive layer as an electrode or as an antistatic layer. The requirements for a useful electrically-conductive layer in an imaging environment are extremely demanding and thus the art has long sought to develop improved electrically-conductive layers exhibiting the necessary combination of physical, optical and chemical properties.

As described hereinabove, the imaging elements of this invention include at least one electrically-conductive layer comprising a dispersion in a film-forming binder of electronically-conductive particles of antimony-doped tin oxide having an antimony dopant level of greater than 8 atom percent, an X-ray crystallite size of less than 100 Angstroms and an average equivalent circular diameter of less than 15 nanometers but no less than the X-ray crystallite size.

The term "X-ray crystallite" used herein refers to a concept first elaborated for metallurgical systems and described in detail by Klug and Alexander in "X-ray Diffraction Procedures for Polycrystalline and Amorphous Materials" (Wiley-Interscience, New York, 1974, pp. 642–3). Metallurgical cold-working produces dislocations in the microstructure of a metal. This results in the original grains composing the metal microstructure being subdivided into smaller regions known as "domains". These domains are each capable of coherently diffracting X-rays. The distribution of dislocations typically is not uniform inside an individual grain. The highest level of dislocations corresponds to the domain "boundaries" with much lower dislocation levels inside the domains themselves. Each of these domains behaves like a small crystal within the original grain, hence the term "crystallite". The formation of multiple small crystallites within grains results in a broadening of the X-ray diffraction peaks characteristic of the bulk material. The extent of broadening is proportional to the size of the crystallites as well as the extent of angular misorientation between the diffraction planes of the individual crystallites. The average crystallite size determined by evaluating the extent of peak broadening will be nearly equal to that of the original grain in the case of few dislocations, and smaller in the case of multiple dislocations. This concept can be readily expanded to include ceramic powders such as the Sb-doped tin oxide powders of this invention. Rather than metallurgical dislocations, the perturbation to the microstructure of a ceramic material may be in the form of a crystallographic lattice "defect" resulting from a vacancy or dopant introduced into the lattice, from the inclusion of a second phase or "impurity" in a grain, from dislocations caused by the application of internal or external physical forces or stresses or by any other perturbations to the individual ceramic grains. Physical perturbations to the ceramic grains can result from preparative techniques such as thermal treatments, size reduction processes as well as other processes commonly used to synthesize ceramic powders.

The antimony-doped tin oxide powders utilized in this invention combine a high level of antimony content and a small crystallite size which, as indicated hereinabove, permits them to be milled to very small sizes without significant degradation of their electrical performance. This permits the use of substantially lower dry weight coverages and/or tin oxide to binder weight ratios of the antimony-doped tin oxide particles in the electrically-conductive layer to achieve comparable or lower surface resistivities than were obtained in the prior art. Additional benefits resulting from the decrease in coverage of antimony-doped tin oxide particles include decreased optical density and minimized image tone change.

The antimony-doped tin oxide particles employed in this invention can be represented by the formula:

$$Sb_xSn_{1-x}O_2$$

wherein x has a value of greater than 0.08.

Electronically-conductive antimony-doped tin oxide particles are available commercially from a number of sources including Keeling & Walker Ltd., DuPont Chemicals, Mitsubishi Metals and Nissan Chemical Industries. Only those products which have the required combination of high antimony dopant level and small X-ray crystallite size are suitable as starting materials for use in this invention.

Particles suitable for use in the electrically-conductive layer of this invention can be obtained by reducing the average particle size of commercially available antimony-doped tin oxide powders having the required high level of antimony dopant and small crystallite size. Such size reduction to obtain particles with an average equivalent circular diameter of less than 15 nanometers can be carried out by means of attrition milling, preferably in the presence of a polyanionic dispersing aid, to obtain a stable aqueous colloidal dispersion. The aqueous colloidal dispersion can then be combined with a film-forming binder, and optionally with other additives, and applied in the form of a thin layer to the support.

The prior art has described antimony-doped tin oxides with a very wide range of antimony content. According to U.S. Pat. No. 4,495,276 preferred hetero atoms for the doping of tin oxide intended for use in electrically-conductive layers are Sb, Nb and halogen atoms. The preferred amount of the hetero atom is said to be in the range of 0.01 to 30 mole % and more preferably 0.1 to 10 mole %. U.S. Pat. No. 4,394,441 also teaches that the preferred antimony dopant level in antimony-doped tin oxide is 0.1 to 10 mole %. The preference for an antimony dopant level of as low as 0.1 mole % is in marked contrast with the present invention which requires that the antimony dopant level be greater than 8 atom %. Heretofore, it was not known that a high antimony content of greater than 8 atom % is associated with a small crystallite size of less than 100 Angstroms. Having a small crystallite size of less than 100 Angstroms is highly advantageous in that it permits milling the particles to extremely small dimensions without degrading the crystallographic lattice structure of the crystallites and thereby degrading the conductivity. In turn, particles of extremely small dimensions provide high conductivity at greatly reduced coverage and/or lower tin oxide to binder weight ratio. Conversely, particles of low antimony content of substantially less than 8 atom % have a large crystallite size of substantially greater than 100 Angstroms and attempts to mill them to extremely small dimensions will degrade the crystallographic lattice structure and thereby degrade the electrical conductivity.

Commercially available antimony-doped tin oxide powders can be prepared by means of a variety of manufacturing processes including: traditional ceramic, hybrid ceramic, coprecipitation, spray pyrolysis, hydrothermal precipitation, as well as other unspecified processes. In the traditional ceramic process, finely ground powders of tin oxide and an antimony oxide are intimately mixed, heat treated at elevated temperatures (>700° C.) for various periods of time, and subsequently remilled to a fine powder. In one variation of the ceramic process (See British Patent No. 2,025,915) an insoluble tin-containing precursor powder is prepared by precipitation from solution and treated with a solution of a soluble antimony compound, the slurry is dried, and the resulting powder heat-treated as in the ceramic process. This method is said to achieve a more homogeneous distribution of the antimony dopant ions throughout the bulk of the particles. It is possible to prepare even more homogeneously doped powders by means of a variety of other chemical coprecipitation processes including steps with heat treatment temperatures lower than those used for typical ceramic processes. In some of the coprecipitation processes, the separate heat treatment step is eliminated altogether (e.g., hydrothermal precipitation).

As the antimony dopant level of Sb-doped tin oxide powders is increased to above about 8 atom %, the specific conductivity of the powder is observed to decrease. Further, it is well known that for conductive continuous thin film coatings of polycrystalline Sb-doped tin oxide prepared by a variety of deposition processes (e.g., high vacuum deposition using reactive atmosphere sputtering, chemical vapor deposition at ambient pressure, deposition by spray pyrolysis, coating of a pyrolyzable precursor by dipping or spin coating and subsequent firing, etc.), the maximum value for conductivity is observed for antimony dopant levels in the range of about 3 to 6 atom % Sb (e.g., T. H. Kim and K. H. Yoon, *J. Appl. Phys.,* 70, 2739–44 (1991); Y. Takahashi and Y. Wada, *J. Electrochem. Soc.,* 137, 267–72 (1990); E. Shanthi, V. Dutta, A. Banerjee, and K. L. Chopra, *J. Appl. Phys.,* 51, (12), 6243–51 (1980) and references cited therein). For nearly all the reported methods for thin film preparation, the conductivity of Sb-doped tin oxide thin films decreases substantially when Sb dopant levels exceed about 8 atom % Sb (e.g., A. F. Carroll & L. H. Slack, *J. Electrochem. Soc.,* 123, (12) 1889–93(1976); A. G. Sabnis and L. D. Feisel, *J. Vac. Sci. Technol.,* 14, (2), 685–9 (1977)). Therefore, it was particularly surprising to find that the electrically-conductive layers of this invention, which comprise a dispersion in a film-forming binder of antimony-doped tin oxide particles having an antimony dopant level of greater than 8 atom percent and an X-ray crystallite size of less than 100 Angstroms, are significantly more conductive (at a constant dry weight coverage or tin oxide to binder ratio) than similar electrically-conductive layers in which the antimony-doped tin oxide particles do not meet these criteria.

It was also surprising to find that the crystallite size of Sb-doped tin oxide particles decreases with increasing antimony level up to about 12 atom % Sb for a variety of commercially available Sb-doped tin oxide particles. The average x-ray crystallite size was determined by evaluating the peak profiles of two prominent diffraction peaks (101) and (202)) in the x-ray powder diffraction pattern of Sb-doped tin oxides by the Warren-Averbach method (viz., B. E. Warren and B. L. Averbach, *J. Appl. Phys.,* 21, 595–9 (1950); H. P. Klug and L. E. Alexander, "X-ray Diffraction Procedures for Polycrystalline and Amorphous Materials", 2nd Edition, New York: Wiley-Interscience, 1974, Pp. 642–655) prior to attrition milling of the particles. It should be noted that uncertainty in determining the extent of diffraction peak broadening due to crystallite size effects versus instrument effects increases with increasing crystallite size. The use of this method to determine crystallite sizes of a variety of commercially available Sb-doped tin oxide powders revealed an apparent dependence of the crystallite size on the Sb dopant level (as atom % Sb) as shown in FIG. 1 herein. The observed crystallite size smoothly decreases from about 250 Å for an undoped tin oxide sample down to less than about 50 Å for samples with a maximum antimony dopant level of approximately 12 atom % Sb. For antimony dopant levels greater than approximately 20 atom % Sb the crystallite size appears to approach a minimum of about 20 Å.

The equilibrium phase diagram for the ternary Sb-Sn-O system is not well known. However, binary Sb-$SnO_2$ solid solutions in the ternary Sn-Sb-O system likely lie on the $Sb_2O_4$-$SnO_2$ tie line. From the limited amount of published data, it appears that antimony is completely soluble in tin oxide for antimony concentrations less than about 20 atom % Sb and heat treatment temperatures from about 600° to 900° C. Other reports claim upper limit % Sb solubility in $SnO_2$ as high as 20 to 25 atom % Sb for a heat treatment temperature of 1000° C. (e.g., T. Matsushita and I. Jamai, *J. Ceram. Soc. Jpn,* 80, 305 (1972); S. N. Kustova, D. V. Tarasova, I. P. Olen'kova, and N. N. Chumachenko, *Kinet. Katal.,* 17, 744–9 (1976)) and up to 10 atom % Sb for samples heated at 600° C (e.g., T. Birchall, R. J. Bouchard, and R. D. Shannon, *Can. J. Chem.,* 51, 2077–81 (1973); F. J. Berry, P. E. Holbourn, and F. W. D. Woodhams *J.C.S. Dalton,* 2241–5 (1980)).

Although no specific mechanism to describe the apparent relationship of the crystallite size and the antimony level in the antimony-doped tin oxides of this invention has been put forth in the prior art, it is reasonable to postulate that the introduction of antimony ions as dopants into the tin oxide crystallographic lattice may be considered to be equivalent to the introduction of a dislocation or defect in the ceramic tin oxide grains. The fact that the solubility of Sb in tin oxide is limited to less than 10 atomic percent and certainly less than 20 atomic percent may result in the formation of second phases in the antimony-doped tin oxide grains if the synthetic process used to introduce the dopant Sb ions does not distribute them homogeneously throughout the grain. There may be regions in individual ceramic grains in which the concentration of Sb ions exceeds the solubility limits, resulting in the precipitation out of solid solution of an antimony oxide phase which has a different crystallographic structure than tin oxide. The resulting crystallographic lattice "mismatch" within a grain may lead to significant crystallographic stress. This stress can be relieved by a variety of well-known mechanisms. The antimony oxide can be segregated to the surface of the grain and into the grain boundary regions between the individual ceramic grains. During thermal processing in the preparation of the antimony-doped tin oxide powder, the presence of an antimony oxide-rich layer would suppress the normal surface diffusion growth process of the individual tin oxide crystallites. However, intercrystallite association can occur resulting in the formation of aggregates of multiple tin oxide crystallites linked through antimony oxide-rich "necks" or regions. Such a phenomenon has been reported recently by Xu and coworkers (*Journal of Materials Science,* 27, 963–71 (1992)) in the course of a study of methods for stabilizing ultrafine tin oxide particles. They found that by introducing a variety of metal oxide additives during thermal processing, they were able to inhibit substantially the degree of crystallite growth. They found that the mean crystallite size determined by X-ray diffraction and TEM generally coincided. However, the aggregates which formed consisted of four or more tin oxide crystallites fused together with the additives into a composite grain. An alternative mechanism can be postulated based on X-ray diffraction and electron microscopic studies of crystals of antimony-doped tin oxide by Pyke, Reid, and Tilley (*Journal of Solid State Chemistry,* 25, 231–7 (1978)). They reported that even relatively large single crystals of pure tin oxide could be prepared free from crystallographic defects or faults. When they attempted to introduce antimony ions as a dopant during the growth of the crystals, the doped crystals which formed contained extensive twinning even at low levels of Sb (about 1 atomic percent). Twinning is usually considered a form of stress relief in crystals. It also provides a mechanism for changing the anion to cation stoichiometry of a crystal slightly and provides lattice sites with different coordination from those in the rest of the lattice. Since antimony oxide has a different crystallographic structure than tin oxide, the antimony ions may be more readily accomodated in twin boundary regions. The formation of twin boundaries would be expected to increase with increasing antimony ion concentration. The segregation of the antimony ions to the twin boundaries would limit their influence on the lattice parameter measured for the bulk crystal. However, the formation of twin boundaries in individual grains would be expected to produce domains with different angular misorientation between the diffraction planes of the individual crystallites (180° for adjacent domains sharing a twin boundary), resulting in an apparent decrease in crystallite size.

The antimony-doped tin oxide particles utilized in this invention are of a very small primary particle size, i.e., an average equivalent circular diameter of less than 15 nanometers. A small particle size minimizes light scattering which would result in reduced optical transparency of the conductive coating. The relationship between the size of a particle or agglomeration of particles, the ratio of its refractive index to that of the medium in which it is incorporated, the wavelength of the incident light, and the light scattering efficiency of the particle is described by Mie scattering theory (G. Mie, *Ann. Physik.,* 25, 377 (1908)). A discussion of this topic as it is relevant to photographic applications has been presented by T. H. James ("The Theory of the Photographic Process", 4th ed, Rochester: EKC, 1977). In the case of Sb-doped tin oxide particles coated in a thin layer employing a typical photographic gelatin binder system, it is necessary to use powders with an average particle size less than about 0.1 μm in order to limit the scattering of light at a wavelength of 550 nm to less than about 10%. For shorter wavelength light, such as ultraviolet light used to expose daylight insensitive graphic arts films, particles less than about 0.08 μm in size are preferred.

In addition to ensuring transparency of thin conductive layers, a small average primary particle size is needed to form the multiplicity of interconnected chains or networks of conductive particles which provide multiple electrically conductive pathways in the conductive layer. In the case of the commercially available Sb-doped tin oxide bulk powders, the average particle (or agglomerate) size (typically 0.5–0.9 μm) must be reduced substantially by various attrition milling processes, such as small media milling, well known in the art of pigment dispersion and paint making. However, not all commercial Sb-doped tin oxide powders are sufficiently chemically homogeneous to permit the extent of size reduction required to ensure optical transparency and still retain sufficient particle conductivity to form conductive networks in thin coated layers. The specific combination of high Sb dopant level (greater than 8 atom %) and small crystallite size of the Sb-doped tin oxides utilized herein permits more extensive reduction in particle size without substantially increasing the specific powder resistivity of the particles. Average primary particle sizes (determined from TEM micrographs) of less than 15 nm for the Sb-doped tin oxides of this invention permit extremely thin conductive layers to be coated. These layers exhibit comparable conductivity to much thicker layers containing larger size particles (e.g., >50 nm) of other Sb-doped tin oxides that do not meet the criteria specified herein.

Since antimony-doped tin oxide particles of the dimensions required by this invention, namely an average equivalent circular diameter of less than 15 nanometers, are not generally available on a commercial basis, the practice of the present invention typically requires that the commercially available particles be milled to achieve the desired size. The commercially available particles typically have an average equivalent circular diameter of greater than 300 nanometers. Thus, a very substantial degree of size reduction is needed. However, the particles cannot be milled to less than the crystallite size as this would. substantially destroy their electrical conductivity. Thus, in a particular embodiment, the present invention is directed to a method of providing an imaging element with an electrically-conductive layer, the method comprising the steps of:

(1) providing an antimony-doped tin oxide having an antimony dopant level of greater than 8 atom percent, an X-ray crystallite size of less than 100 Angstroms and an average equivalent circular diameter of greater than 300 nanometers;

(2) milling the antimony-doped tin oxide to reduce its average equivalent circular diameter to less than 15 nanometers but not less than the X-ray crystallite size thereof;

(3) preparing a coating composition containing the milled antimony-doped tin oxide and a film-forming binder; and (4) forming from the coating composition the electrically-conductive layer.

The weight ratio of the Sb-doped tin oxide particles to the binder in the dispersion is another important factor which strongly influences the ultimate conductivity achieved by the coated layer. If this ratio is small, little or no antistatic property is exhibited. If this ratio is very large, adhesion between the conductive layer and the support or overlying layers can be diminished. The optimum weight ratio of conductive particles to binder varies depending on the particle size, binder type, and the conductivity requirements. The volume fraction of Sb-doped tin oxide particles is preferably in the range of from about 20 to 80% of the volume of the coated layer. This corresponds to an Sb-doped tin oxide to binder weight ratio of about 60:40 to 96:4. The dry weight coverage of Sb-doped tin oxide in the conductive layer is preferably less than 2000 $mg/m^2$, and more preferably in the range of from about 50 to about 1000 $mg/m^2$.

Lower dry weight coverages of Sb-doped tin oxide in conductive layers result in increased optical transparency of these layers. Thus, for constant values of surface resistivity and Sb-doped tin oxide to binder weight ratio, coatings containing the Sb-doped tin oxide of this invention are substantially more transparent than are coatings prepared from dispersions of other Sb-doped tin oxides. Conversely, for a constant value of net optical density (ortho) the values for the surface resistivities of coatings prepared from dispersions of the Sb-doped tin oxides of this invention are nearly an order of magnitude less than are those of coatings prepared from dispersions of other Sb-doped tin oxides.

Further, for coatings prepared at equivalent dry weight coverages of Sb-doped tin oxide, the weight ratios of Sb-doped tin oxide to binder in coatings prepared from dispersions of the Sb-doped tin oxides of this invention can be substantially less than those for other Sb-doped tin oxides and still maintain comparable values of surface resistivity. The main advantage to using a lower level of tin oxide, and consequently a higher level of binder in such coatings, is an increase in the degree of adhesion of the conductive layer to the support or to an overlying layer.

Film-forming binders that are useful in the electrically-conductive layers of this invention include: water-soluble polymers such as gelatin, gelatin derivatives, maleic acid anhydride copolymers; cellulose compounds such as carboxymethyl cellulose, hydroxyethyl cellulose, cellulose acetate butyrate, diacetyl cellulose or triacetyl cellulose; synthetic hydrophilic polymers such as polyvinyl alcohol, poly-N-vinylpyrrolidone, acrylic acid copolymers, polyacrylamide, their derivatives and partially hydrolyzed products, vinyl polymers and copolymers such as polyvinyl acetate and polyacrylate acid ester; derivatives of the above polymers; and other synthetic resins. Other suitable binders include aqueous emulsions of addition-type polymers and interpolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and methacrylonitrile, vinyl acetates, vinyl ethers, vinyl and vinylidene halides and olefins and aqueous dispersions of polyurethanes or polyesterionomers.

Solvents useful for preparing dispersions and coatings of Sb-doped tin oxide particles by the method of this invention include: water; alcohols such as methanol, ethanol, propanol, isopropanol; ketones such as acetone, methylethyl ketone, and methylisobutyl ketone; esters such as methyl acetate and ethyl acetate; glycol ethers such as 2-methoxyethanol, 2-ethoxyethanol, 1-methoxy-2-propanol; and mixtures thereof.

In addition to binders and solvents, other components that are well known in the photographic art may also be present in the electrically-conductive layer. These additional components include: surfactants and coating aids, thickeners, cross-linking agents or hardeners, soluble and/or solid particle dyes, antifoggants, matte beads, lubricants, and others.

Dispersions of the Sb-doped tin oxide particles prepared by the method of this invention and formulated with polymeric binders and additives can be coated onto a variety of photographic supports including: poly(ethylene terphthalate), poly(ethylene naphthalate), polycarbonate, polystyrene, cellulose nitrate, cellulose acetate, cellulose acetate butyrate, cellulose acetate propionate, and laminates thereof. Suitable supports can be either transparent or opaque depending upon the application. Transparent film supports can be either colorless or colored by the addition of a dye or pigment. The film supports can be surface treated by various processes including corona discharge, glow discharge, UV exposure, solvent washing or overcoated with polymer such as vinylidene-chloride-containing copolymers, butadiene-based copolymers, glycidyl acrylate or methacrylate-containing copolymers and maleic anhydride containing copolymers. Suitable paper supports include polyethylene-, polypropylene-, and ethylene-butylene copolymer-coated or laminated paper and synthetic papers.

Formulated dispersions of the Sb-doped tin oxide particles can be applied to the aforementioned film or paper supports by any of a variety of well-known coating methods. Handcoating techniques include using a coating rod or knife or a doctor blade. Machine coating methods include skim pan/air knife coating, hopper coating, roller coating, gravure coating, curtain coating, bead coating or slide coating.

Conductive layers of this invention can be applied to the support in any of various configurations depending upon the requirements of the specific imaging application. In the case of photographic elements for graphics arts applications, a conductive layer can be applied to the polyester film base during the support manufacturing process after orientation of the cast resin on top of a polymeric undercoat layer. A conductive layer also can be applied as a subbing layer under the sensitized emulsion, or on the side of the support opposite the emulsion as well as on both sides of the support. When a conductive layer containing colloidal Sb-doped tin oxide particles is applied as a subbing layer under the sensitized emulsion, it is not necessary to apply any intermediate layers such as barrier layers or adhesion promoting layers between it and the sensitized emulsion, although they can optionally be present. Alternatively, a conductive layer can be applied as part of a multi-component curl control layer on the side of the support opposite to the sensitized emulsion. The conductive layer would typically be located closest to the support. An intermediate layer, containing primarily binder and antihalation dyes, functions as an antihalation layer. The outermost layer containing binder, matte, and surfactants functions as a protective overcoat. Other addenda, such as polymer lattices to improve dimensional stability, hardeners or crosslinking agents, surfactants, and various other conventional additives can be present optionally in any or all of the layers.

In the case of photographic elements for direct or indirect x-ray applications, the conductive layer can be applied as a subbing layer on either side or both sides of the film support. In one type of photographic element, the conductive subbing layer is applied to only one side of the film support and the sensitized emulsion coated on both sides of the film support. Another type of photographic element contains a sensitized emulsion on only one side of the support and a pelloid containing gelatin on the opposite side of the support. A conductive layer can be applied under the sensitized emulsion or alternatively, the pelloid. Additional optional layers can be present. In another photographic element for x-ray applications, a conductive subbing layer can be applied under or over a gelatin subbing layer containing an antihalation dye or pigment. Alternatively, both antihalation and antistatic functions can be combined in a single layer containing conductive particles, antihalation dye, and a binder. Such a hybrid layer is typically coated on one side of a film support under the sensitized emulsion.

A conductive layer of this invention may also be used as the outermost layer of an imaging element, for example, as the protective overcoat that overlies a photographic emulsion layer. Alternatively, a conductive layer also can function as an abrasion resistant backing layer applied on the side of the film support opposite to the imaging layer.

Conductive layers of this invention can be included in an imaging element comprising a support, an imaging layer, and a transparent layer containing magnetic particles dispersed in a binder such as is described in U.S. Pat. No. 4,990,276; European Patent 459,349; *Research Disclosure,* Item #34390, Nov. 1992; and references cited therein. As disclosed in these publications, the magnetic particles can consist of ferro- and ferrimagnetic oxides, complex oxides including other metals, metallic alloy particles with protective coatings, ferrites, hexaferrites, etc. and can exhibit a variety of particulate shapes, sizes, and aspect ratios. The magnetic particles also can contain a variety of dopants and may be overcoated with a shell of particulate or polymeric materials. The conductive layer can be located beneath the magnetic layer as a subbing layer, overlying the magnetic layer as a backcoat or can be on the opposite side of the support from the magnetic layer underlying the emulsion layer as a subbing layer or overlying the emulsion layer as a topcoat.

Imaging elements incorporating conductive layers of this invention useful for other specific imaging applications such as color negative films, color reversal films, black-and-white films, color and black-and-white papers, electrographic media, thermal dye transfer recording media, laser ablation media, and other imaging applications should be readily apparent to those skilled in photographic and other imaging arts.

The present invention is further illustrated by the following examples of its practice. In these examples, three commercially available antimony-doped tin oxide powders were evaluated, namely ECP 3010 XC and ECP 3005 XC antimony-doped tin oxide powder from DuPont Chemicals (Performance Products) and CPM-375 antimony-doped tin oxide powder from Keeling & Walker Ltd. All three of these commercially available powders were attrition-milled under identical milling conditions with varying milling times in order to prepare colloidal dispersions. Of these three, only the ECP 3010 XC powder meets the requirements of this invention in terms of the level of antimony dopant and the X-ray crystallite size. The ECP 3010 XC powder has an antimony content of 10.7 atom percent and an x-ray crystallite size of 53±2 Angstroms. The ECP 3005 XC powder has an antimony content of 7.0 to 7.2 atom percent and an X-ray crystallite size of 113±2 Angstroms. The CPM-375 powder has an antimony content of 6.8 to 7.4 atom percent and an X-ray crystallite size of 120±5 Angstroms.

The colloidal dispersions prepared from the three commercial powders were dried and the packed powder DC resistivities of the residual powders were measured using a two-probe test cell similar to that described in U.S. Pat. No. 5,236,737. The values for powder resistivity in ohm-cm are reported in Table 1 below.

EXAMPLES 1–5

A coating composition suitable for preparing an electrically-conductive layer was prepared by combining 278.36 g of demineralized water, 1.2 g gelatin, 0.81 g of 3,6-dimethyl-4-chlorophenol(biostat) dissolved in 0.22 g of methyl alcohol, 0.159 g of a 15% aqueous solution of chrome alum (hardener), 0.20 g of a 15% aqueous saponin solution (coating aid), 0.075 g of a 40% aqueous dispersion of polymethylmethacrylate matte particles and 20 g of a 30% aqueous dispersion of colloidal antimony-doped tin oxide particles stabilized with 1% of a dispersing aid (pentasodium salt of nitrilotrimethylene phosphonic acid available from MONSANTO CHEMICAL COMPANY under the trademark DEQUEST 2006). The colloidal antimony-doped tin oxide particles were type ECP 3010 XC particles obtained from DuPont Chemicals and had an antimony dopant level of 10.7 atom percent and an x-ray crystallite size of 53±2 Angstroms. For use in this invention, they were milled for 90 minutes to an average equivalent circular diameter of 8 nanometers.

The above-described coating composition was applied with a coating hopper to a 4-mil thick polyethylene terephthalate film support that had been previously coated with a vinylidene chloride/ acrylonitrile/itaconic acid terpolymer. The wet laydown of the coating composition applied to the film support was 12 $ml/m^2$ which corresponds to an antimony-doped tin oxide dry weight coverage of 207 $mg/m^2$.

The surface electrical resistivity (SER) of the electrically-conductive layer was measured after conditioning for 24 hours at 50% R.H. using a two-probe parallel electrode method as described in U.S. Pat. No. 2,801,191. Optical density of the electrically-conductive layer was measured using an X-Rite Model 361T densitometer. The values obtained for SER and net optical density (ortho) are reported in Table 1 below.

Additional electrically-conductive coatings containing lower coverages of the antimony-doped tin oxide were prepared by diluting the above-described coating composition with deionized water containing saponin as a coating aid. Coatings with nominal dry coverages of 185, 150, 130 and 75 $mg/m^2$ were prepared as Examples 2 to 5, respectively. The surface resistivities and net optical densities of these electrically-conductive layers were measured in the manner described above and are reported in Table 1.

Comparative Examples A–D

A coating composition was prepared as in Example 1 except that the antimony-doped tin oxide particles were particles obtained from Keeling & Walker Ltd. under the trademark STANOSTAT CPM-375 and had an antimony dopant level of 6.8 to 7.4 atom percent and an x-ray crystallite size of 120±5 Angstroms. They were milled for 105 minutes to an average equivalent circular diameter of 16 nanometers. The coating composition was diluted with deionized water containing saponin as a coating aid to prepare electrically-conductive coatings with nominal dry coverages of antimony-doped tin oxide of 300, 250, 150 and 100 $mg/m^2$ as Comparative Examples A–D, respectively. The surface resistivities and net optical densities of these electrically-conductive layers were measured in the manner described above and are reported in Table 1.

Comparative Examples E and F

A coating composition was prepared as in Example 1 except that the antimony-doped tin oxide particles were type ECP 3005 XC particles obtained from DuPont Chemicals and had an antimony dopant level of 7.0 to 7.2 atom percent and an x-ray crystallite size of 113±2 Angstroms. They were milled for 90 minutes to an average equivalent circular diameter of 16 nanometers. The coating composition was diluted with deionized water containing saponin as a coating aid to prepare electrically-conductive coatings with nominal dry coverages of antimony-doped tin oxide of 270 and 120 mg/m$^2$ as Comparative Examples E and F, respectively. The surface resistivities and net optical densities of these electrically-conductive layers were measured in the manner described above and are reported in Table 1.

TABLE 1

| Example No. | Atom % Sb | Crystallite Size (Angstroms) | Powder Resisitivity (ohm-cm) | Dry Coverage (mg/m$^2$) | SER (log ohms/square) | Net Optical Density (Ortho) |
|---|---|---|---|---|---|---|
| 1 | 10.7 | 53 ± 2 | 25 | 207 | 7.3 | 0.013 |
| 2 | 10.7 | 53 ± 2 | 25 | 185 | 7.6 | 0.013 |
| 3 | 10.7 | 53 ± 2 | 25 | 152 | 7.7 | 0.010 |
| 4 | 10.7 | 53 ± 2 | 25 | 130 | 8.1 | 0.0085 |
| 5 | 10.7 | 53 ± 2 | 25 | 75 | 8.4 | 0.005 |
| A | 7.4 | 120 ± 5 | 106 | 295 | 8.0 | 0.015 |
| B | 7.4 | 120 ± 5 | 106 | 248 | 8.2 | 0.014 |
| C | 7.4 | 120 ± 5 | 106 | 147 | 9.2 | 0.010 |
| D | 7.4 | 120 ± 5 | 106 | 97 | 9.5 | 0.007 |
| E | 7.2 | 113 ± 2 | 28 | 273 | 8.2 | 0.015 |
| F | 7.2 | 113 ± 2 | 28 | 123 | 9.5 | 0.0085 |

Figure 2:
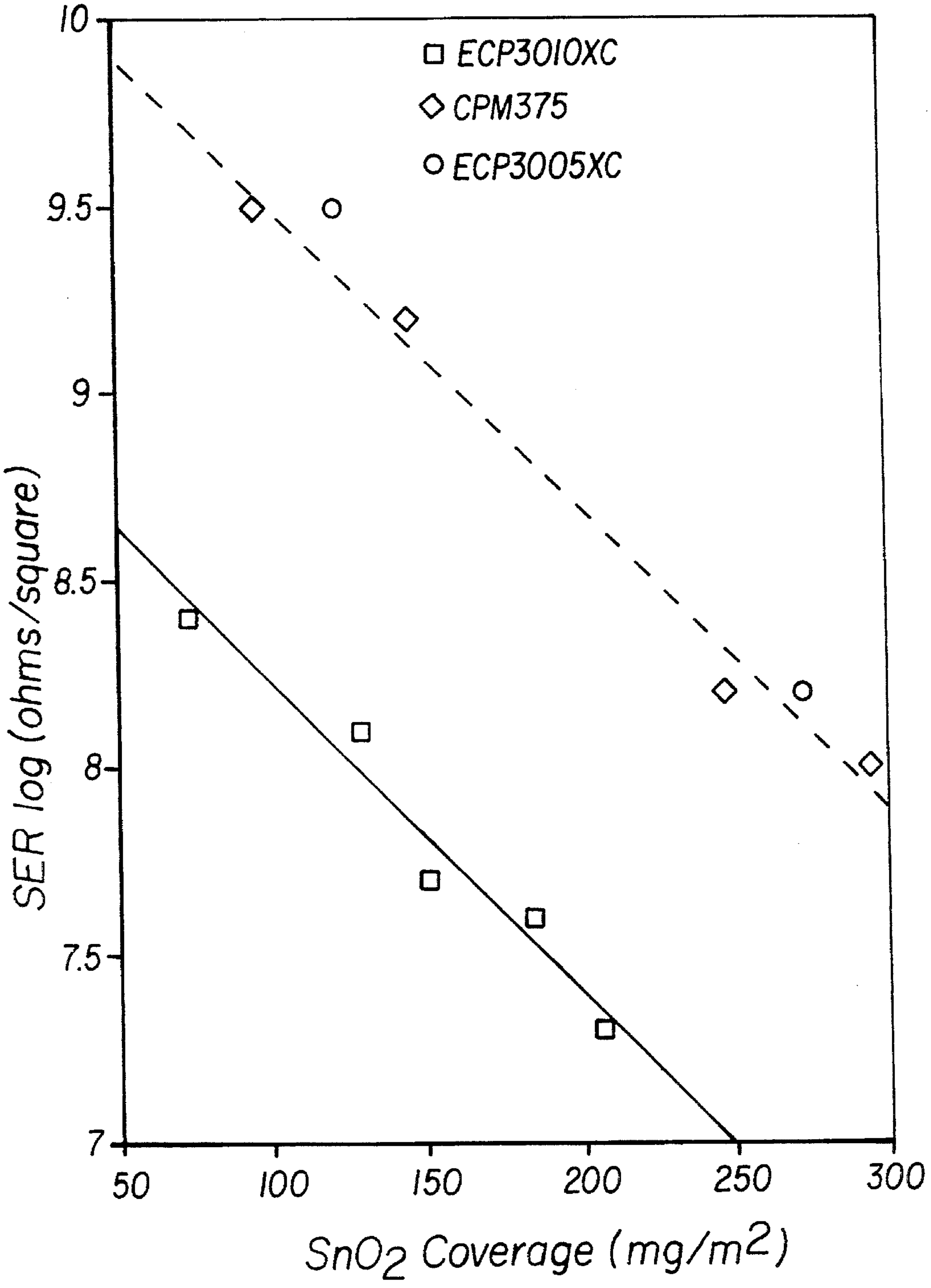
FIG. 2 is a plot showing the relationship between surface electrical resistivity and dry weight coverage for antimony-doped tin oxide particles both within and outside the scope of the present invention.
Figure 3:
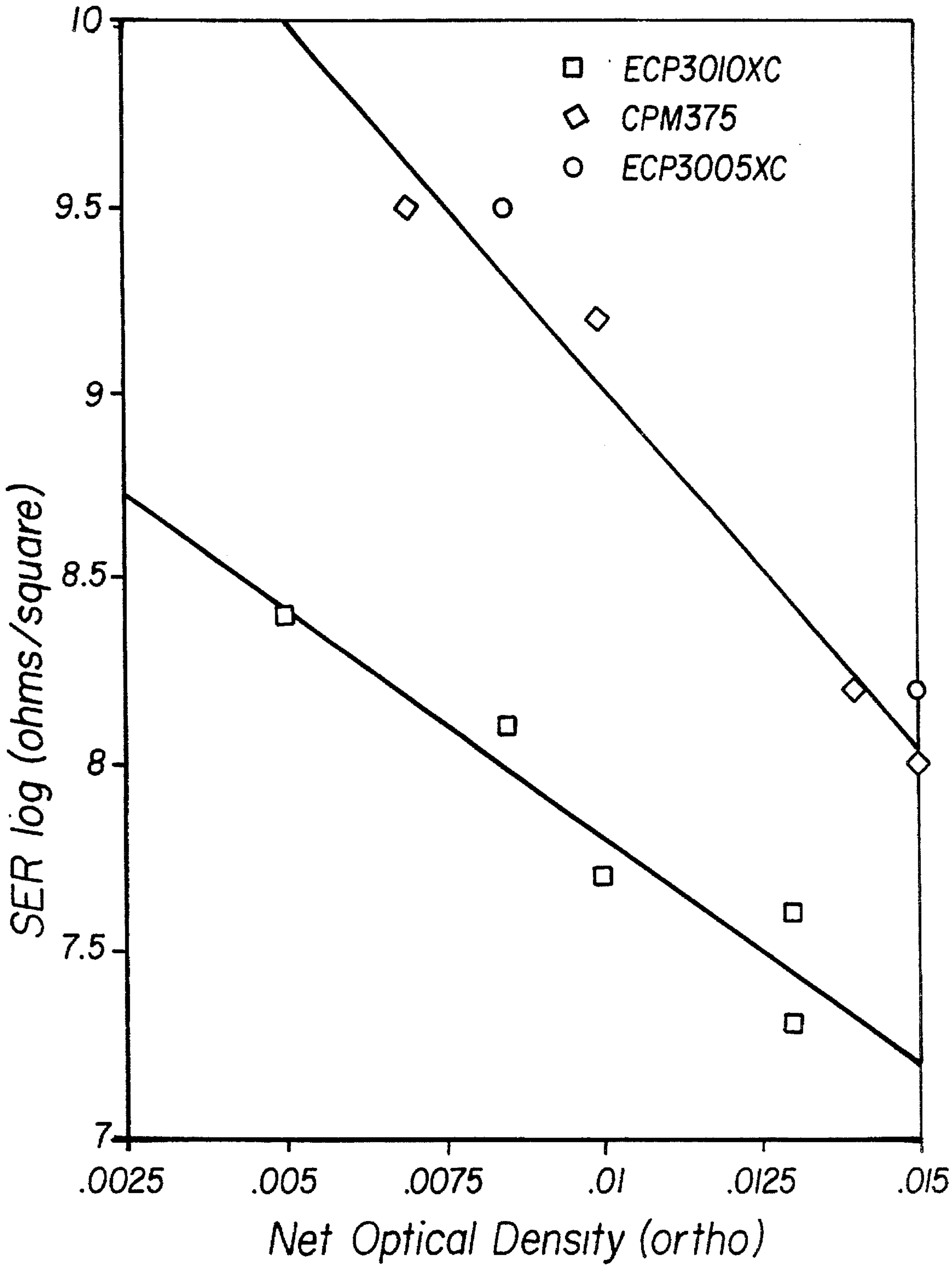
FIG. 3 is a plot showing the relationship between surface electrical resistivity and net optical density for antimony-doped tin oxide particles both within and outside the scope of the present invention.

As shown by the data in Table 1, the use of antimony-doped tin oxide particles with an antimony dopant level of greater than 8 atom %, an x-ray crystallite size of less than 100 Angstroms and an average equivalent circular diameter of less than 15 nanometers, as in Examples 1–5, provided superior performance in terms of surface electrical resistivity and net optical density, than the use of antimony-doped tin oxide particles which did not meet these criteria as in Comparative Examples A–F. To clearly indicate the improvement in conductivity and transparency achieved by this invention, the data in Table 1 relating SER to dry coverage for each of the three different antimony-doped tin oxide particles evaluated are plotted in FIG. 2, while the data in Table 1 relating SER to net optical density for each of the three different antimony-doped tin oxide particles evaluated are plotted in FIG. 3. The data plotted in FIGS. 2 and 3 represent a constant weight ratio of antimony-doped tin oxide to polymeric binder of 85:15.

As shown by the data in Table 1, coatings prepared from the three different colloidal dispersions exhibited the same type of dependence of surface resistivity on dry weight coverage. Coatings prepared from colloidal dispersions of the ECP 3010 XC powder required less than about one-third of the dry weight coverage of coatings prepared from colloidal dispersions of either ECP 3005 XC or CPM-375 powder to attain comparable surface resistivity values at the same tin oxide to binder weight ratio. This represents a major improvement in the performance of the electrically-conductive layer.

The invention has been described in detail, with particular reference to certain preferred embodiments thereof, but it should be understood that variations and modifications can be effected within the spirit and scope of the invention.

We claim:

1. An imaging element for use in an image-forming process; said imaging element comprising a support, an image-forming layer, and an electrically-conductive layer; said electrically-conductive layer comprising a dispersion in a film-forming binder of electronically-conductive particles of antimony-doped tin oxide having an antimony dopant level of greater than 8 atom percent, an x-ray crystallite size of less than 100 Angstroms and an average equivalent circular diameter of less than 15 nanometers but no less than the X-ray crystallite size; the volume fraction of said particles being from about 20 to about 80% of the volume of said electrically-conductive layer.

2. An imaging element as claimed in claim 1 wherein the dry weight coverage of said particles is less than 2000 mg/m$^2$.

3. An imaging element as claimed in claim 1, wherein the dry weight coverage of said particles is in the range of from about 50 to about 1000 mg/m$^2$.

4. An imaging element as claimed in claim 1, wherein said binder is a water-soluble polymer.

5. An imaging element as claimed in claim 1, wherein said binder is gelatin.

6. An imaging element as claimed in claim 1, wherein said binder is polyvinylbutyral.

7. An imaging element as claimed in claim 1, wherein said binder is a vinylidene chloride-based terpolymer latex.

8. An imaging element as claimed in claim 1, wherein said antimony-doped tin oxide has an antimony dopant level of about 10.7 atom percent and an x-ray crystallite size of about 50 Angstroms.

9. An imaging element as claimed in claim 1, wherein said support is a cellulose acetate film.

10. An imaging element as claimed in claim 1, wherein said support is a poly(ethylene terephthalate) film or a poly(ethylene naphthalate) film.

11. An imaging element as claimed in claim 1, wherein said element is a photographic film.

12. An imaging element for use in an image-forming process; said imaging element comprising a support, an image-forming layer, a transparent magnetic layer comprising magnetic particles dispersed in a film-forming binder, and an electrically-conductive layer comprising a dispersion in a film-forming binder of electronically-conductive particles of antimony-doped tin oxide having an antimony dopant level of greater than 8 atom percent, an x-ray crystallite size of less than 100 Angstroms and an average equivalent circular diameter of less than 15 nanometers but no less than the X-ray crystallite size; the volume fraction of said particles being from about 20 to about 80% of the volume of said electrically-conductive layer.

13. A photographic film comprising:

(1) a support;

(2) an electrically-conductive layer which serves as an antistatic layer overlying said support; and (3) a silver halide emulsion layer overlying said electrically-conductive layer; said electrically-conductive layer comprising a dispersion in a film-forming binder of electronically-conductive particles of antimony-doped tin oxide having an antimony dopant level of greater than 8 atom percent, an x-ray crystallite size of less than 100 Angstroms and an average equivalent circular diameter of less than 15 nanometers but no less than the X-ray crystallite size; the volume fraction of said particles being from about 20 to about 80% of the volume of said electrically-conductive layer.

14. A photographic film comprising:

(1) a support;

(2) a silver halide emulsion layer on one side of said support;

(3) an electrically-conductive layer which serves as an antistatic layer on the opposite side of said support; and (4) a curl control layer overlying said electrically-conductive layer; said electrically-conductive layer comprising a dispersion in a film-forming binder of electronically-conductive particles of antimony-doped tin oxide having an antimony dopant level of greater than 8 atom percent, an x-ray crystallite size of less than 100 Angstroms and an average equivalent circular diameter of less than 15 nanometers but no less than the X-ray crystallite size; the volume fraction of said particles being from about 20 to about 80% of the volume of said electrically-conductive layer.

15. A photographic film comprising:

(1) a support;

(2) a silver halide emulsion layer on one side of said support; and (3) an electrically-conductive layer which serves as an antistatic backing layer on the opposite side of said support; said electrically-conductive layer comprising a dispersion in a film-forming binder of electronically-conductive particles of antimony-doped tin oxide having an antimony dopant level of greater than 8 atom percent, an x-ray crystallite size of less than 100 Angstroms and an average equivalent circular diameter of less than 15 nanometers but no less than the X-ray crystallite size; the volume fraction of said particles being from about 20 to about 80% of the volume of said electrically-conductive layer.

16. A photographic film comprising:

(1) a support;

(2) a silver halide emulsion layer on one side of said support;

(3) an electrically-conductive layer which serves as an antistatic layer on the opposite side of said support; and (4) an abrasion-resistant backing layer overlying said electrically-conductive layer; said electrically-conductive layer comprising a dispersion in a film-forming binder of electronically-conductive particles of antimony-doped tin oxide having an antimony dopant level of greater than 8 atom percent, an x-ray crystallite size of less than 100 Angstroms and an average equivalent circular diameter of less than 15 nanometers but no less than the X-ray crystallite size; the volume fraction of said particles being from about 20 to about 80% of the volume of said electrically-conductive layer.

17. A method of providing an imaging element, that comprises a support and an image-forming layer, with an electrically-conductive layer; said method comprising the steps of:

(1) providing an antimony-doped tin oxide having an antimony dopant level of greater than 8 atom percent, an X-ray crystallite size of less than 100 Angstroms and an average equivalent circular diameter of greater than 300 nanometers, (2) milling said antimony-doped tin oxide to reduce its average equivalent circular diameter to less than 15 nanometers but no less than the X-ray crystallite size thereof;

(3) preparing a coating composition containing said milled antimony-doped tin oxide and a film-forming binder; and (4) forming from said coating composition said electrically-conductive layer; the amount of said milled antimony-doped tin oxide particles incorporated in said coating composition being sufficient to provide a volume fraction of said particles that is from about 20 to about 80% of the volume of said electrically-conductive layer.

18. A method as claimed in claim 17, wherein the amount of said coating composition employed to form said electrically-conductive layer is sufficient to provide a dry weight coverage of said particles in the range of from about 50 to about 1000 $mg/m^2$.

* * * * *